United States Patent

Bailey

Patent Number: 6,014,355
Date of Patent: *Jan. 11, 2000

[54] SYSTEM FOR RECORDING DIGITAL INFORMATION IN A PULSE-LENGTH MODULATION FORMAT

[75] Inventor: Jack H. Bailey, Villa Park, Calif.

[73] Assignee: Discovision Associates, Irvine, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/105,935

[22] Filed: Aug. 13, 1993

Related U.S. Application Data

[63] Continuation of application No. 08/075,275, Jun. 11, 1993, Pat. No. 5,321,680, which is a continuation of application No. 07/948,267, Sep. 21, 1992, Pat. No. 5,253,244, which is a continuation of application No. 07/825,640, Jan. 24, 1992, abandoned, which is a continuation of application No. 07/645,638, Jan. 25, 1991, Pat. No. 5,084,852, which is a continuation of application No. 07/499,217, Mar. 16, 1990, Pat. No. 5,003,526, which is a continuation of application No. 06/782,156, Oct. 2, 1985, abandoned, which is a continuation of application No. 06/169,238, Jul. 16, 1980, abandoned.

[51] Int. Cl.[7] .................................................. G11B 7/00
[52] U.S. Cl. .................................. 369/59; 369/58; 369/47
[58] Field of Search ............................... 360/32, 33.1, 39, 360/48, 51; 369/59, 111, 124, 125, 47, 48, 49, 50, 54, 58; 358/261.1, 335, 342, 459

[56] References Cited

U.S. PATENT DOCUMENTS

| | | |
|---|---|---|
| 563,148 | 6/1896 | Essick . |
| 1,364,078 | 1/1921 | Crehore . |
| 2,887,674 | 5/1959 | Greene . |
| 3,226,685 | 12/1965 | Potter et al. . |
| 3,281,806 | 10/1966 | Lawrence . |
| 3,365,706 | 1/1968 | King . |
| 3,414,894 | 12/1968 | Jacoby . |
| 3,501,586 | 3/1970 | Russell . |
| 3,587,090 | 6/1971 | Labeyrie . |
| 3,624,637 | 11/1971 | Irwin . |
| 3,689,899 | 9/1972 | Franaszek . |

(List continued on next page.)

FOREIGN PATENT DOCUMENTS

| | | |
|---|---|---|
| 346921 | 12/1978 | Australia . |
| 346921 | 12/1978 | Austria . |
| 2343017 | 8/1973 | Germany . |
| 28 03 603 | 8/1978 | Germany . |
| 50-62563 | 5/1975 | Japan . |
| 52-128024 | 10/1977 | Japan . |
| 54-80726 | 6/1979 | Japan . |
| 644432 | 10/1950 | United Kingdom . |
| 1382515 | 2/1975 | United Kingdom . |
| 1489774 | 10/1977 | United Kingdom . |
| 1570799 | 7/1980 | United Kingdom . |

OTHER PUBLICATIONS

Tang et al, "Block Codes for a Class of Noiseless Constrained Channels", Information and Control 17, 436–461, 1970.

Sato et al, "A New Optical Communication System Using the Pulse Interval and Width Modulation Code", IEE Transactions on Cable Television, vol. CATV–4, No. 1, Jan. 1979.

Kenville, "Optical Video Disc for Digital Mass Memory Applications", IEEE, 1978.

Spitzer et al, "High Bit–Rate, High–Density Magnetic–Tape Recording", undated.

(List continued on next page.)

*Primary Examiner*—Muhammad Edun
*Attorney, Agent, or Firm*—Steptoe & Johnson LLP

[57] ABSTRACT

An improved system for recording and playing back digital information in a special pulsed length modulation format on a disc-shaped record. The digital information is stored in a succession of alternating marks and spaces, both having lengths that are discretely variable in accordance with a succession of multi-bit binary code blocks.

52 Claims, 2 Drawing Sheets

U.S. PATENT DOCUMENTS

| | | |
|---|---|---|
| 3,701,846 | 10/1972 | Zenzefilis . |
| 3,795,902 | 3/1974 | Russell . |
| 3,996,613 | 12/1976 | Manning et al. . |
| 4,020,282 | 4/1977 | Halpern . |
| 4,022,986 | 5/1977 | Teer . |
| 4,041,530 | 8/1977 | Kramer et al. . |
| 4,094,013 | 6/1978 | Hill . |
| 4,161,753 | 7/1979 | Bailey et al. . |
| 4,210,931 | 7/1980 | Bailey et al. . |
| 4,222,072 | 9/1980 | Bailey et al. . |
| 4,232,388 | 11/1980 | Isailovic . |
| 4,238,843 | 12/1980 | Carasso et al. . |
| 4,349,901 | 9/1982 | Howe ............ 369/45 |
| 4,371,894 | 2/1983 | Camras ............ 358/342 |
| 4,491,940 | 1/1985 | Tinet . |
| 4,500,484 | 2/1985 | Gregg . |
| 4,916,686 | 4/1990 | Bailey ............ 369/59 |
| 5,003,526 | 3/1991 | Bailey ............ 369/59 |
| 5,253,244 | 10/1993 | Bailey ............ 369/59 |

OTHER PUBLICATIONS

Tamura et al, "A Coding Method in Digital Magnetic Recording", IEEE Transactions on Magnetics, Sep. 1972, pp. 612–614.

Opinion, United States District Court for the District of Delaware, Oct. 26, 1998, *DiscoVision Associates v. Disc Manufacturing, Inc.*, Civil Action No. 95–21–SLR.

Patel, A.M.; Charge–Constrained Byte–Oriented (0,3) Code; IBM Technical Disclosure Bulletin; vol. 19, No. 7, Dec. 1976, pp. 2715–2717.

Heemskerk et al., "Compact Disc: System Aspects and Modulation", Phillips Tech. Rev. 40, No. 6, 1982, pp. 157–164.

Sony Es Review 1979, vol., 34 (Annex 1), English translation (Annex 1A).

DOI, et al. "A Long Play Digital Audio Disc System", Sony Audio Technology Ctr., Tokyo, Japan, Presented in Brussels, Belgium 1979 (Annex 2).

"Development of PCM Audio Disc System for Long Play of Two and Half Hours on One Side", Showa 53, Oct. 5th, Sony Corporation Press Release (Annex 3 and 3A) No Year Available.

Annex 4: Japanese newspaper, Oct. 6, 1978.

Annex 5: Japanese newspaper, Oct. 6, 1978.

Annex 6: extracted copy of "Stero Technic" of Japanese Magazine, Dec. 1978.

Annex 7: "PCM Audio Disc System", published on Electronics of Japanese magazine, p. 1219, Dec. 1978.

Annex 8: DAD–1X, Sony brochure Date unavailable.

Annex 9: extracted copy of Billboard, No. 18, 1978.

Annex 10: Sony Es Review, vol. 34, 1979.

Annex 11:English translation of Japanese article "PCM Audio Disc (Record) Player", on Television Society, pp. 1–21 Date Unavailable.

Annex 12: "A system of Optical Digital Audio Disc" Date unavailable.

Ogawa et al., Sony Technical Report of IECE, #EA7–8–27 (Jul. 1978).

Sato et al., "Pulse Interval and Width Modulation for Video Transmission", IEEE Transactions on Cable Television, vol. CATV–3, No. 4, Oct. 1978, pp. 165–173.

"Audio 2–Channel Transmission Experiment By Pulse: Internal–Width Modulation Method", Pre–document of Lecture for National convention of Television Association in 1979; (pub. Jul. 1, 1979); pp. 171–172 (6–12), original and translation.

"Multi–level Transmission by Pulse Interval and Width Modulation Code", Technical Research Report of Electronic Communication Assoc. Technical Rpt; vol. 78, No. 188; (pub. Dec. 12, 1978); pp. 19–24 (c.s. 78–163), original and translation.

"Pulse Interval and Width Modulation for Video Transmission", Technical Research Report of Electronic Communication Association; Tech. Rpt. vol. 77, No. 239; (pub. Feb. 20, 1978); pp. 15–21 (c.s. 77–173), original and translation.

"Audio Transmission Experiment by Pulse Interval Width Modulation Code", Pre–document of Lecture for National convention of Television Association in 1979; (pub. Jul. 1, 1979); pp. 175–176 (6–14), original and translation.

Ogawa et al. "A System of Optical Digital Audio Disc", Extraction from Technical Research Report of Electronic Communication Assoc.; Tech. Rpt. vol. 78, No. 93; (pub. Jul. 25, 1978); pp. 19–24 (EA78–27), original and translation.

Yamazaki, Yoshio "PCM Audio Recording", Dept. of Science & Technology, Waseda University); Magazine of Television Association; vol. 33, No. 1, 1979; pp. 2–10 and 26–31, original and translation.

Horiguchi et al., "An Optimization of Modulation Codes In Digital Recording", IEEE Transactions on Magnetics, vol. MAG–12, No. 6, Nov. 1976, pp. 740–742.

Gallo, Luigi, "Signal System Design for a Digital Video Recording System", SMPTE Journal, Oct. 1977, vol. 86, pp. 749–756.

Patel, Arvind M., "New Method for Magnetic Encoding Combines Advantages of Older Techniques", Computer Design, Aug. 1976, pp. 85–91.

"3–2 Modulating Method", Japanese article, and translation Date Unavailable.

| CODE BLOCK | HEXADECIMAL EQUIVALENT | MARK (OR SPACE) LENGTH |
|---|---|---|
| 0000 | 0 | 1.0L |
| 0001 | 1 | 1.1L |
| 0010 | 2 | 1.2L |
| 0011 | 3 | 1.3L |
| 0100 | 4 | 1.4L |
| 0101 | 5 | 1.5L |
| 0110 | 6 | 1.6L |
| 0111 | 7 | 1.7L |
| 1000 | 8 | 1.8L |
| 1001 | 9 | 1.9L |
| 1010 | A | 2.0L |
| 1011 | B | 2.1L |
| 1100 | C | 2.2L |
| 1101 | D | 2.3L |
| 1110 | E | 2.4L |
| 1111 | F | 2.5L |

SYSTEM FOR RECORDING DIGITAL INFORMATION IN A PULSE-LENGTH MODULATION FORMAT

This is a continuation of application Ser. No. 08/075,275, filed Jun. 11, 1993, now U.S. Pat. No. 5,321,680; which is a cont. of Ser. No. 07/948,267 filed Sep. 21, 1992, now U.S. Pat. No. 5,253,244; which is a cont. of Ser. No. 07/825,640 filed Jan. 24, 1992, abandoned; which is a cont. of Ser. No. 07/645,638 filed Jan. 25, 1991, U.S. Pat. No. 5,084,852; which is a cont. of Ser. No. 07/499,217 filed Mar. 16, 1990, U.S. Pat. No. 5,003,526; which is a cont. of Ser. No. 06/782,156 filed Oct. 2, 1985, abandoned; which is a cont. of Ser. No. 06/169,238 filed Jul. 16, 1980, abandoned.

BACKGROUND OF THE INVENTION

This invention relates generally to systems for storing digital information, and, more particularly, to video disc systems for storing digital information in a pulse-length modulation format.

Video disc systems are becoming widely used for storing digital information with a high recording efficiency. The information is ordinarily recorded on the disc as a succession of spaced marks arranged in a plurality of substantially circular and concentric recording tracks, for example, a spiral pattern. One particularly efficient system has recorded the digital information in a pulse-length modulation format, in which each of the successive spaced marks has a discretely-variable length representative of a separate, multi-bit code block. The spacing between successive marks, or alternatively the spacing between the beginning edges of successive marks, is ordinarily maintained constant.

The video disc can include a glass substrate, with a thin, metallic recording layer overlaying it, and apparatus for recording the digital information on the disc ordinarily focuses a writing beam of light onto the disc, as the disc is rotated at a uniform rate, with the intensity of the beam being modulated in accordance with the digital information to be recorded. When the intensity exceeds a predetermined threshold, a non-reflective pit or mark is formed in the recording layer, whereas when the intensity does not exceed the threshold, the recording layer is not affected. Thus, the lengths of the successive, spaced marks correspond to the time duration the intensity of the focused beam exceeds this threshold.

The recorded digital information is recovered from replicas of the recorded video disc by scanning it with a reading beam of light having a uniform intensity, to produce a reflected beam having an intensity modulated by the recorded pattern of spaced marks. The length of time the intensity of the reflected beam exceeds a predetermined level is then measured to determine the length of the corresponding mark and thus the particular binary code block it represents.

Although this prior pulse-length modulation technique has proven effective in recording digital information with a relatively high recording efficiency, there is still a need for a system for recording digital information with an even higher efficiency. The present invention fulfills this need.

SUMMARY OF THE INVENTION

The present invention is embodied in a system for recording and playing back digital information on a record mediun, in which the information is stored in a succession of spaced marks of discretely-variable lengths. The length of each mark is representative of a separate one of a succession of multi-bit binary code blocks. In accordance with the invention, the spaces between successive marks also have discretely-variable lengths representative of separate blocks in the succession of code blocks. Digital information is thereby recorded on the record medium with a yet higher recording efficiency.

More particularly, the present invention has particular utility in a video disc system in which a video signal is recorded on a disc-shaped record in a succession of substantially circular and concentric recording tracks. The recording apparatus functions initially to digitize the video signal and to compress the digitized signal, using known data compression techniques. The digitized signal is then arranged in a succession of code blocks of the same or mixed lengths, and a binary modulation signal is formed having transitions in state determined in accordance with the successive code blocks. In the preferred embodiment, each code block includes four binary bits, and the successive states of the modulation signal have sixteen possible discrete durations.

The modulation signal is coupled to a light intensity modulator, which modulates the intensity of a writing beam such that the intensity is alternately greater than and less than a predetermined threshold for time durations corresponding to the succession of multi-bit code blocks. The intensity-modulated beam is focused onto the record, as the record is rotated at a prescribed rate, to form corresponding microscopic pits or marks in a prescribed pattern. Using conventional techniques, the record can then be used to produce video disc replicas.

The recorded digital information is played back from disc replicas by scanning the successive tracks with a reading beam of light having a substantially uniform intensity. This produces a reflected (or transmitted) beam having an intensity modulated by the recorded pattern of alternating marks and spaces. The playback apparatus measures the time durations of the successive marks and spaces and determines the particular code blocks each represents. After de-compressing the succession of detected code blocks, the original analog video signal can be re-created.

In the preferred embodiment, each of the successive recording tracks is used to record a separate video frame. Since the special pulse-length modulation format results in a recorded pattern of marks and spaces having a variable length, however, it is usually the case that less than an entire track is required to record each video frame. When this occurs, the remainder of the track is occupied by alternating marks and spaces representative of a prescribed filler code.

Other aspects and advantages of the present invention will become apparent from the following description of the preferred embodiment, taken in conjunction with the accompanying drawings, which disclose, by way of example, the principles of the invention.

DESCRIPTION OF THE PREFERRED EMBODIMENT

Figure 1:
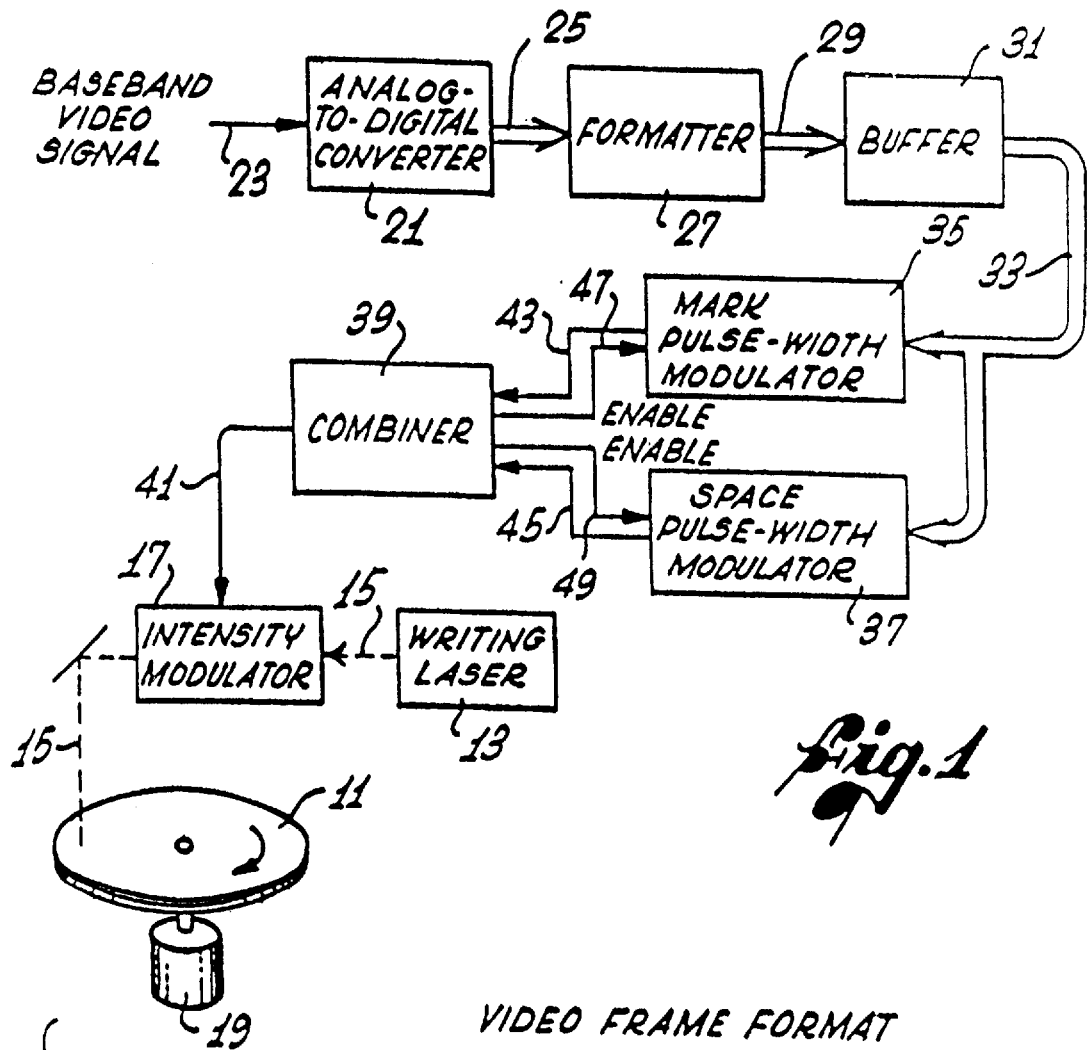
FIG. 1 is a simplified block diagram of recording apparatus in accordance with the present invention, for recording a digitized video signal on a video disc, in a special pulse-length modulation format.

Referring now to the drawings, and particularly to FIG. 1, there is shown recording apparatus for recording a digitized video signal on a disc-shaped record 11. The apparatus includes a writing laser 13 for producing a writing beam of light 15 having a substantially uniform intensity, and an intensity modulater 17 for modulating the intensity of the beam in accordance with a digital modulation signal to be recorded. The apparatus further includes a radially-movably objective lens (not snown) for focusing the intensity-modulated beam onto the record, and a spindle motor 19 for rotating the record at a prescribed, uniform rate (e.g., 1800 r.p.m.). The focused beam thereby forms a succession of substantially circular and concentric recording tracks in the record.

The record 11 includes a glass substrate with a metallic recording layer overlaying it, and the focused beam forms a microscopic pit in the recording layer whenever its intensity exceeds a predetermined threshold. The intensity is modulated to be alternately greater and less than this threshold, in accordance with the digital modulation signal to be recorded, so that a coresponding succession of spaced pits or marks is formed in the record.

In accordance with the invention, the digitized video signal is recorded in the record 11 in a special pulse-length modulation format, in which both the successive marks and the spaces between successive marks have discretely-variable lengths representative of a succession of multi-bit binary code blocks. Digital information is thereby recorded on the record with an improved recording efficiency.

More particularly, the recording apparatus of FIG. 1 includes an analog-to-digital converter 21, for sampling a baseband video signal input on line 23 and converting it to a corresponding digital signal. This digital signal is coupled over lines 25 to a formatter 27, for removal of vertical and horizontal sync signals, compression of the digital information, and formatting of the compressed data into successive four-bit code blocks. These successive code blocks are transfered over lines 29 to a suitable storage buffer 31, which outputs the blocks, one by one over lines 33, to a MARK pulse-width modulator 35 and a SPACE pulse-width modulator 37. The two pulse-width modulators operate, in an alternating fashion, to produce output pulses having discretely-variable time durations corresponding to the particular code blocks applied to their respective input terminals. The buffer 31 must have sufficient storage capacity to store a predetermined number of 4-bit code blocks, since the blocks are input at a substantially uniform rate but are output at a variable rate determined by the particular information the code blocks contain.

Figures 2, 4:
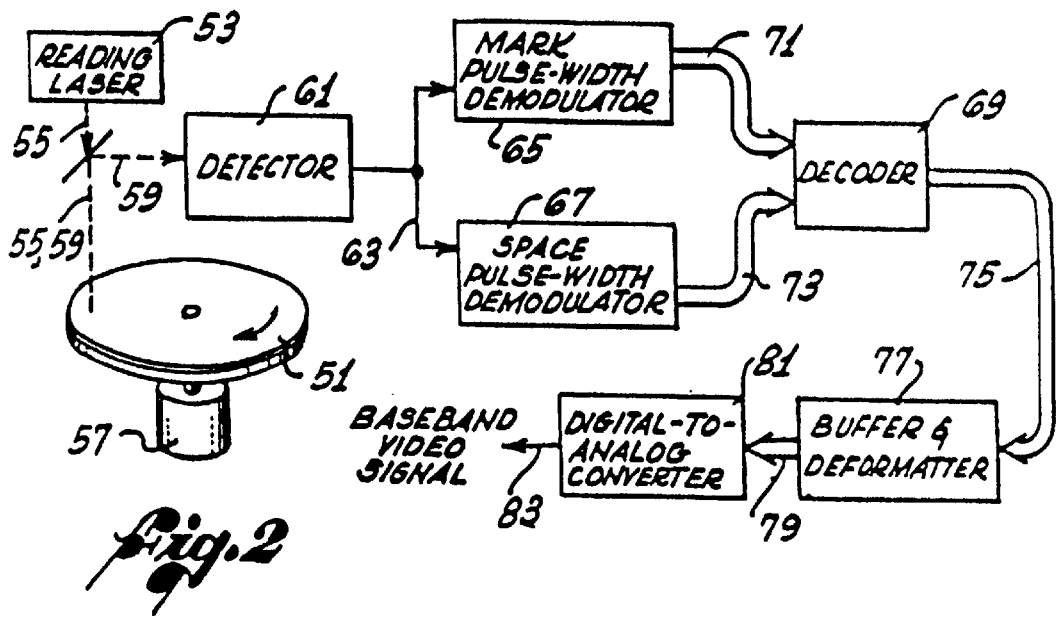
FIG. 2 is a simplified block diagram of playback apparatus in accordance with the present invention, for recovering the digitized video signal stored on the video disc in the special pulse-length modulation format.
FIG. 4 is a table showing the prescribed lengths for the sucessive marks (and spaces) corresponding to each of the plurality of possible 4-bit code blocks being recorded.

FIG. 4 is a table showing one suitable relationship between the sixteen possible 4-bit code blocks and the time durations for the corresponding pulses output by the two pulse-width modulators 35 and 37. It will be observed that the possible pulse lengths vary in uniform steps between a minimum length of 1.0 L and a maximum length of 2.5 L. An alternative relationship between the sixteen possible code blocks and the corresponding pulse durations is provided in a copending and commonly-assigned application for U.S. Pat. No. 974,183, filed in the name of Jack H. Bailey and entitled "Video Player/Recorder With Non-Linear Mark Length Modulation".

The recording apparatus of FIG. 1 further includes a combiner device 39 for producing the modulation signal coupled over line 41 to the intensity modulator 17, in accordance with the successive pulse-length modulated pulses received over lines 43 and 45 from the MARK and SPACE modulators 35 and 37, respectively. The combiner also controls the tinming of the MARK and SPACE modulators by providing ENABLE signals over lines 47 and 49, respectively, initiating operation of each modulator immediately after the previous output pulse from the other modulator has terminated. The modulation signal output by the combiner on line 41 is in a logical "one" state whenever the MARK modulator 35 outputs a pulse, and in the logical "zero" state whenever the SPACE modulator 37 outputs a pulse. The desired pattern of alternating marks and spaces, representative of the successive four-bit code blocks, is thereby formed in the record 11.

Figure 3:
FIG. 3 is a schematic diagram illustrating the format of the data on the video disc.
Figure 3:
Figure 3:
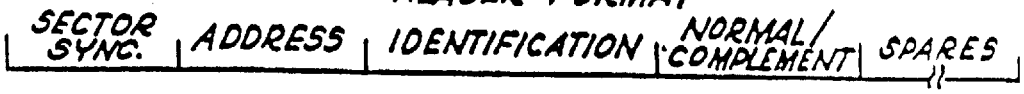
Figure 3:

In the preferred embodiment, each of the successive recording tracks in the record 11 records the digital information for a single video frame. As shown in FIG. 3, each track includes N sectors, and each sector includes a header portion, a data portion, and a filler portion of variable length. A fixed amount of data is included in each data portion, but since each mark and space are variable in length, the length of the entire data portion is likewise variable. The filler portion is therefore usually necessary. In the preferred embodiment, the filler code comprises a special sequence of marks and spaces that can be used in calibrating apparatus for playing back the recorded information. Both the header and filler portions of each sector are generated by the formatter 27 (FIG. 1), which includes registers for storing data representative of the current frame and sector number and of the particular location in the sector currently being recorded.

FIG. 3 depicts the header portion of each sector to include a synchronizing code, a sector address code, an identification code indicating the character of the data (e.g., video, audio, etc.), a normal/complement code, and spares for permitting expansion of any of the previous codes. The normal/complement code is used as a special means for minimizing the length of the data in each sector. As previously mentioned, each sector includes a fixed amount of data, but is variable in length, in accordance with the particular code blocks being recorded. If it is determined by the formatter 27 (FIG. 1) that the required track length to record a particular sector of data exceeds a predetermined average value, then the formatter outputs the complement of each code block for recording instead, and modifies the normal/complement code in the corresponding header, accordingly. In this manner, the maximum track length required to store the data in any sector corresponds to the recording of marks and spaces that are all of average length, i.e., that correspond to the code blocks "0111" or "1000".

FIG. 3 also depicts the format of the data portion of each sector. It will be observed that the data includes M successive boxels, each preceded by a special supermark code, for synchronization and re-initialization. In the preferred embodiment, each boxel corresponds to an 8×8 matrix derived from a segment of the video frame.

FIG. 2 depicts apparatus for playing back a video disc replica 51 of the recorded record 11 of FIG. 1. The apparatus includes a reading laser 53 for producing a reading beam of light 55 having a substantially uniform intensity. This beam is focused onto the disc 51 by a radially-movable lens (not shown) as the disc is rotated at a uniform rate by a spindle motor 57. This produces a reflected beam 59 that is modulated in intensity in accordance with the recorded pattern of marks on the disc. The apparatus then detects the modulated beam and measures the lengths of the successive pulse-length modulated marks and spaces, to determine the corresponding 4-bit code blocks they represent. The original baseband video signal is thereafter reconstructed.

More particularly, the playback apparatus of FIG. 2 includes a detector 61 for detecting the modulated intensity of the reflected beam 59 and producing a corresponding electrical signal. This signal is coupled over line 63 to a MARK pulse-width demodulator 65 and a SPACE pulse-width demodulator 67, which measure the lengths of the successive marks and spaces, respectively, and determine the particular code blocks they represent Each demodulator can conveniently include a linear ramp generator that is initiated and terminated by the detected edges of each mark (or space), along with an analog-to-digital converter for converting the peak value of the ramp to the corresponding four-bit code block. The apparatus further includes a decoder 69 for interleaving the successive four-bit code blocks supplied on lines 71 and 73 from the MARK and SPACE demodulators 65 and 67, respectively.

The sequence of code blocks is coupled over lines 75 from the decoder 69 to a buffer and deformatter device 77, which de-compresses the data using conventional techniques, converting it back to substantially its original digital format. Additionally, the deformatter inserts conventional digitized vertical and horizontal sync signals into the decompressed video data. The deformatter then produces a real-time digital video signal for coupling over lines 79 to a digital-to-analog converter 81, which reconstructs the original analog baseband video signal for output on line 83. The buffer and deformatter device 77 must include sufficient memory capacity to store a predetermined portion of the successive incoming code blocks, which are received from the decoder 69 at a variable rate determined by on the particular information the codeblocks contain, while the information is being output in a substantially real-time fashion.

It will be appreciated from the foregoing description that the present invention provides an improved system for recording and playing back digital information on a disc-shaped record. The information is stored in a succession of spaced marks, with the lengths of both the marks and the spaces between successive marks being discretely variable in accordance with a succession of multi-bit code blocks. The digital information is thereby stored with an improved recording efficiency.

Although the present invention has been described in detail with reference to its presently preferred embodiment, it will be understood by those of ordinary skill in the art that various modifications can be made without departing from the spirit and scope of the invention. Accordingly, it is not intended that the invention be limited, except as by the appended claims.

I claim:

1. A system for recording digital information on a record medium using a writing source, comprising:

means for receiving an input signal to be recorded;

means for sampling and formatting the input signal to produce successive samples indicative of the input signal;

a mark pulse width modulator, receiving a first series of samples, and producing an output pulse of a logical "1" level, having a discretely variable time duration corresponding to each successive sample of the first series;

a space pulse width modulator, receiving a second series of samples, and producing an output pulse of a logical "0" level, having a discretely variable time duration corresponding to each successive sample of the second series;

controlling means for alternately enabling said mark pulse width modulator and said space pulse width modulator and for combining said logical "1" level and logical "0" level pulses from said mark pulse width modulator and said space pulse width modulator into a continuous stream of pulses of opposite polarities, so that each two immediately adjacent output signals from said controlling means include one pulse of said logical "0" level immediately adjacent to another pulse of said logical "1" level; and means for using said continuous stream of pulses to modulate an output of the writing source to write on the record medium.

2. A system according to claim 1, wherein the first series of samples received by said mark pulse width modulator is the same series of samples as the second series of samples received by said space pulse width modulator.

3. A system as in claim 1 wherein said mark pulse width modulator and said space pulse width modulator each limit lengths of the successive pulses in run length to be no less than a minimum length and no greater than a maximum length, the maximum length being greater than double the minimum length and also limits the pulses in run length such that a minimum non-zero length difference between a first length of any pulse and a second length of any other pulse is less than said minimum length.

4. An optical playback system, comprising:

means for reading optical information from a record medium;

means for detecting modulated intensities of the optical information and producing a corresponding electrical signal;

mark pulse width demodulator means, responsive only to logical "1" levels of the electrical signal, for demodulating a pulse width during which the electrical signal stays at the logical "1" level, to produce an output indicative of the pulse width of the logical "1" level;

space pulse width demodulator means, responsive only to logical "0" levels of the electrical signal, for demodulating a pulse width during which the electrical signal stays at the logical "0" level, to produce an output indicative of the pulse width of the logical "0" level; and means responsive to said outputs of said mark pulse width demodulator means and said space pulse width demodulator means, for interleaving information from said mark pulse width demodulator means with information from said space pulse width demodulator means to produce decoded information indicative of the optical information on the record medium.

5. A system as in claim 4, wherein said mark pulse width demodulator means and said space pulse width demodulator means each include means, triggering on edges between logical "0" and logical "1" levels, for beginning and ending timing periods to determine the pulse widths.

6. A playback system as in claim 4 wherein said mark pulse width modulator means and said space pulse width modulator means each limit lengths of the successive marks and spaces in run length to be no less than a minimum length and no greater than a maximum length, the maximum length being greater than double the minimum length and also limiting the marks and spaces in run length such that a minimum non-zero length difference between a first length of any mark or space and a second length of any other mark or space is less than said minimum length.

7. A method for recording digital information on a record medium, comprising the steps of:

receiving an input signal to be recorded;

sampling and formatting the input signal to produce successive samples indicative of the input signal;

receiving a first series of samples, and producing an output pulse of a logical "1" level, having a discretely variable time duration corresponding to each successive sample of the first series;

receiving a second series of samples, and producing an output pulse of a logical "0" level, having a discretely variable time duration corresponding to each successive sample of the second series;

assembling a continuous stream of pulses of opposite polarities, so that each two immediately adjacent output signals from said controlling means include one pulse of said logical "0" level immediately adjacent to another pulse of said logical "1" level by combining alternate ones of said logical "1" level and logical "0" level pulses; and using said continuous stream of pulses to modulate an output of an writing source to write on the record medium.

8. A method according to claim 7, wherein the first series of samples is the same series of samples as the second series of samples.

9. A method as in claim 7 wherein said receiving and producing steps include the steps of limiting lengths of each of the successive pulses to be no less than a minimum length and to be not greater than a maximum length, the maximum length being greater than double the minimum length, and also limiting said lengths such that a minimum non-zero length difference between a first length of any pulse and a second length of any other pulse is less than said minimum length.

10. A method of playing back information from an optical disk, comprising the steps of:

reading optical information from a record medium;

detecting modulated intensities of the optical information and producing a corresponding electrical signal;

first demodulating, responsive only to logical "1" levels of the electrical signal, a pulse width during which the electrical signal stays at the logical "1" level, to produce a first output;

second demodulating, responsive only to logical "0" levels of the electrical signal, a pulse width during which the electrical signal stays at the logical "0" level, to produce a second output; and producing decoded information indicative of the optical information on the record medium responsive to said first and second outputs.

11. A method as in claim 10, wherein said first and second demodulating steps include steps of triggering on edges between logical "0" and logical "1" levels to determine the pulse widths.

12. A method as in claim 10 wherein said first and second demodulating steps each include the step of recognizing levels of the electrical signal, only when they are no less than the minimum length and not greater than the maximum length, the maximum length being greater than double the minimum length, and also when they are limited in run length such that a minimum non-zero length difference between a first length of any pulse and a second length of any other pulse is less than said minimum length.

13. A system for recording digital information on a record medium using a writing source, comprising:

a terminal which receives a digital signal to be recorded;

a first pulse width modulator, receiving said digital signal, and producing binary output pulses which encodes information in a first binary level to have variable time.

14. A system as in claim 13 wherein said first binary level is a logical "1" level and said second binary level is a logical "0" level.

15. A system as in claim 13 wherein said writing source is a light beam of a form which writes on an optical medium.

16. A system as in claim 13 wherein said first pulse width modulator and said second pulse width modulator each limit lengths of the successive pulses in run length to be no less than a minimum length and no greater than a maximum length, the maximum length being greater than double the minimum length and also limits the pulses in run length such that a minimum non-zero length difference between a first length of any pulse and a second length of any other pulse is less than said minimum length.

17. A system for recording digital information on a record medium using a writing source, comprising:

a terminal which receives a digital signal to be recorded;

a first pulse width modulator, receiving said digital signal, and coding information contained in said digital signal into a form of binary output pulses of a first binary level, said output pulses having variable time durations corresponding to said information contained in said digital signal;

a second pulse width modulator, receiving said digital signal and modifying said binary output pulse to include information from said digital signal into time durations of a second binary level, different than said first level, thereby forming a continuous stream of pulses of opposite polarities, so that each two immediately adjacent pulses include one pulse of said logical "0" level immediately adjacent to another pulse of said logical "1" level; and a writing source driven by said continuous stream of pulses to write on the record medium.

18. A system as in claim 17 wherein said first level is a logical "1" level and said second level is a logical "0" level.

19. A system as in claim 18 wherein said writing source is a light beam of a form which writes on an optical medium.

20. A system as in claim 17 wherein said first mark pulse width modulator and said second space pulse width modulator each limit lengths of the successive pulses in run length to be no less than a minimum length and no greater than a maximum length, the maximum length being greater than double the minimum length and also limits the pulses in run length such that a minimum non-zero length difference between a first length of any first pulse and a second length of any other pulse is less than said minimum length.

21. A method for storing information in an optical record disc comprising steps of:

expressing the information as a binary bit stream;

selecting a plurality of blocks of bits from the bit stream, each said block including an equal, plural number of bits arranged in one of a set of unique bit sequences;

transforming each said block of bits into a corresponding intermediate signal by designating one or more increments of length for each corresponding block of bits without reference to any prior or subsequent block of bits, and without reference to any prior or subsequent intermediate signal, each said unique bit sequence corresponding to a unique designation of one or more increments of length;

generating a final signal that includes the increments of length designated for said blocks of bits in said intermediate signals;

recording the final signal as a set of physical features, said set of physical features including marks and spaces between marks on an optical record disc;

wherein the lengths of spaces vary non-redundantly from the lengths of marks;

wherein each mark and each space can assume one of a set of quantized lengths that vary between a minimum length and a maximum length, said maximum length being greater than double said minimum length; and wherein a minimum non-zero length difference between any two lengths in the set of quantized lengths is less than said minimum length.

22. The method of claim 21 wherein said transforming step includes a step of generating a second block of binary bits.

23. The method of claim 22 wherein said transforming step includes a step of generating a second block of binary bits with an increased number of bits relative to the corresponding block of binary bits from which it is generated.

24. The method of claim 23 wherein the number of bits in a block from among said selected plurality of blocks of bits from the bit stream equals eight.

25. The method of claim 24 wherein the step of generating a second block of binary bits includes a step of generating a block of ten bits.

26. The method of claim 21 wherein the number of bits in a block from among said selected plurality of blocks of bits from the bit stream equals six.

27. The method of any of claims 21–26 further including a step of replicating the record disc to produce a replicated disc.

28. A disc made in accordance with claim 27.

29. A method for storing information in an optical disc record comprising the steps of:

expressing the information as a binary bit stream;

grouping bits of the binary bit stream into a first plurality of blocks of bits, each of said blocks of bits in said first plurality of blocks of bits having an equal, plural number of bits;

transforming each one of said blocks of bits in said first plurality of blocks of bits into a corresponding block of bits in a second plurality of blocks of bits, without reference to any prior or subsequent block of bits from among said first plurality of blocks of bits, each said corresponding block of bits in said second plurality of blocks of bits having an equal, plural number of bits and being one of a limited number of unique bit sequences, said plural number of bits in each block of bits in said second plurality of blocks of bits being increased relative to the number of bits in the corresponding block of bits in said first plurality of blocks of bits, each said unique bit sequence having a unique length designated to represent it;

generating a signal that includes the lengths designated to represent said blocks of bits in said second plurality of blocks of bits;

recording said signal as a set of physical features in an optical disc record, said set of physical features including marks and spaces between marks, wherein said marks and spaces can assume one of a set of quantized lengths that vary between a minimum length and a maximum length, said maximum length being greater than double said minimum length and wherein a minimum non-zero length difference between any two lengths in the set of quantized lengths is less than said minimum length; and wherein said quantized lengths of spaces vary non-redundantly from said quantized lengths of marks.

30. A method for storing information in an optical disc record comprising the steps of:

expressing the information as a binary bit stream;

grouping bits of the binary bit stream into a first plurality of blocks of bits, each of said blocks of bits in said first plurality of blocks of bits having an equal, plural number of bits;

transforming each one of said blocks of bits in said first plurality of blocks of bits into a corresponding block of bits in a second plurality of blocks of bits, without reference to any prior or subsequent blocks of bits from among said first plurality of blocks of bits, each said block of bits in said second plurality of blocks of bits having an equal, plural number of bits and being one of a limited number of unique bit sequences, said plural number of bits in each block of bits in said second plurality of blocks of bits being increased relative to the number of bits in the corresponding block of bits in said first plurality of blocks of bits, each said unique bit sequence having a unique combination of lengths designated to represent it;

generating a signal that includes the lengths designated to represent said blocks of bits in said second plurality of blocks of bits;

recording said signal as a set of physical features in an optical disc record, said set of physical features including marks and spaces between marks, wherein said marks and spaces can assume one of a set of quantized lengths that vary between a minimum length and a maximum length, said maximum length being greater than double said minimum length and wherein a minimum non-zero length difference between any two lengths in the set of quantized lengths is less than said minimum length; and wherein said quantized lengths of spaces vary non-redundantly from said quantized lengths of marks.

31. The method of claim 30 wherein each said block of bits in said first plurality of blocks of bits has eight (8) bits.

32. The method of claim 30 wherein each said corresponding block of bits in said second plurality of blocks of bits has ten (10) bits.

33. The method of either of claims 31 or 32 further including a step of replicating the disc record to produce a replicated disc.

34. A disc made in accordance with claim 33.

35. A method for recovering information stored in an optical disc record comprising the steps of:

detecting a set of physical features in an optical disc record, said set of physical features including marks and spaces between marks, wherein the lengths of spaces vary non-redundantly from the lengths of marks, wherein each mark and each space has a length that is one of a set of quantized lengths that vary between a minimum length and a maximum length, said maximum length being greater than double said minimum length, and wherein a minimum non-zero length difference between any two lengths in the set of quantized lengths is less than said minimum length;

generating a signal from the lengths of said physical features;

expressing said signal as a first plurality of non-overlapping blocks of bits, said first plurality of non-overlapping blocks of bits including selected blocks of bits which are to be transformed into a second plurality of blocks of bits, each of said selected blocks of bits having an equal, plural number of bits; and transforming each of said selected blocks of bits in said first plurality of non-overlapping blocks of bits into a corresponding block of bits in said second plurality of blocks of bits, without reference to any prior or subsequent block of bits from among said selected blocks of bits, each block of bits in said second plurality of blocks of bits having an equal, plural number of bits, said plural number of bits in each block of bits in said second plurality of blocks of bits being decreased relative to the number of bits in the corresponding selected block of bits in said first plurality of non-overlapping blocks of bits.

36. The method of claim 35 further comprising a step of expressing said blocks of bits in said second plurality of blocks of bits as a binary bit stream, said binary bit stream representing the information.

37. The method of claim 35 wherein each block of bits in said second plurality of blocks of bits has eight (8) bits.

38. The method of claim 35 wherein a selected block of bits in said first plurality of non-overlapping blocks of bits corresponds to a length of one mark or space.

39. The method of claim 35 wherein a block of bits in said second plurality of blocks of bits corresponds to a length of one mark or space.

40. The method of claim 35 wherein a selected block of bits in said first plurality of non-overlapping blocks of bits corresponds to lengths of at least one mark and at least one space.

41. The method of claim 35 wherein a block of bits in said second plurality of blocks of bits corresponds to lengths of at least one mark and at least one space.

42. An apparatus for storing information in an optical disc record comprising:

a processor that expresses the information as a binary bit stream;

a formatter that groups bits of the binary bit stream into a first plurality of blocks of bits, each block of bits in said first plurality of blocks of bits having an equal, plural number of bits;

a circuit that transforms each block of bits in said first plurality of blocks of bits into a corresponding block of bits in a second plurality of blocks of bits without reference to any prior or subsequent block of bits from among said first plurality of blocks of bits, each said corresponding block of bits in said second plurality of blocks of bits having an equal, plural number of bits and being one of a limited number of unique bit sequences, said plural number of bits in each block of bits in said second plurality of blocks of bits being increased relative to the number of bits in the corresponding block of bits in said first plurality of blocks of bits, each unique sequence of bits having a unique combination of lengths designated to represent it;

a modulator that generates a signal that includes the lengths designated to represent said blocks of bits in said second plurality of blocks of bits;

a laser that records said signal as a set of physical features in an optical disc record, said set of physical features including marks and spaces between marks, wherein said marks and spaces can assume one of a set of quantized lengths that vary between a minimum length and a maximum length, said maximum length being greater than double said minimum length and wherein a minimum non-zero length difference between any two lengths in the set of quantized lengths is less than said minimum length; and wherein said quantized lengths of spaces vary non-redundantly from said quantized lengths of marks.

43. The apparatus of claim 42 wherein each block of bits in said first plurality of blocks of bits has eight (8) bits.

44. An apparatus for recovering information stored in an optical disc record comprising:

a detector that detects a set of physical features in an optical disc record and generates a signal therefrom, said set of physical features including marks and spaces between marks, wherein the lengths of spaces vary non-redundantly from the lengths of marks, wherein each mark and each space has a length that is one of a set of quantized lengths that vary between a minimum length and a maximum length, said maximum length being greater than double said minimum length, and wherein a minimum non-zero length difference between any two lengths in the set of quantized lengths is less than said minimum length;

a demodulator that expresses said signal as a first plurality of non-overlapping blocks of bits, said first plurality of non-overlapping blocks of bits including selected blocks of bits which are to be transformed into a second plurality of blocks of bits, each of said selected blocks of bits having an equal, plural number of bits;

a circuit that transforms each of said selected blocks of bits in said first plurality of non-overlapping blocks of bits into a corresponding block of bits in said second plurality of block of bits, without reference to any prior or subsequent block of bits from among said selected blocks of bits, each block of bits in said second plurality of blocks of bits having an equal, plural number of bits, said plural number of bits in each block of bits in said second plurality of blocks of bits being decreased relative to the number of bits in the corresponding selected block of bits in said first plurality of non-overlapping blocks of bits.

45. The apparatus of claim 44 further comprising a deformatter that expresses said blocks of bits in said second plurality of blocks of bits as a binary bit stream representing the information.

46. The apparatus of claim 44 wherein each block of bits in said second plurality of blocks of bits has eight (8) bits.

47. The apparatus of claim 44 wherein a selected block of bits in said first plurality of non-overlapping blocks of bits corresponds to a length of one mark or space.

48. The apparatus of claim 44 wherein a block of bits in said second plurality of blocks of bits corresponds to a length of one mark or space.

49. The apparatus of claim 44 wherein a selected block of bits in said first plurality of non-overlapping blocks of bits corresponds to lengths of at least one mark and at least one space.

50. The apparatus of claim 44 wherein a block of bits in said second plurality of blocks of bits corresponds to lengths of at least one mark and at least one space.

51. A method for recovering information stored in an optical disc record comprising the steps of:

detecting a set of physical features in an optical disc record, said set of physical features including marks and spaces between marks, wherein the lengths of spaces vary non-redundantly from the lengths of marks, wherein each mark and each space has a length that is one of a set of quantized lengths that vary between a minimum length and a maximum length, and wherein a minimum non-zero length difference between any two lengths in the set of quantized lengths is less than said minimum length;

generating a signal from the lengths of said physical features;

expressing said signal as a first plurality of non-overlapping blocks of bits, said first plurality of non-overlapping blocks of bits including selected blocks of bits which are to be transformed into a second plurality of blocks of bits, each of said selected blocks of bits having an equal, plural number of bits; and transforming each of said selected blocks of bits in said first plurality of non-overlapping blocks of bits into a corresponding block of bits in said second plurality of blocks of bits, without reference to any prior or subsequent block of bits from among said selected blocks of bits, each block of bits in said second plurality of blocks of bits having an equal, plural number of bits, said plural number of bits in each block of bits in said second plurality of blocks of bits being decreased relative to the number of bits in the corresponding selected block of bits in said first plurality of non-overlapping blocks of bits.

52. An apparatus for recovering information stored in an optical disc record comprising:

a detector that detects a set of physical features in an optical disc record and generates a signal therefrom, said set of physical features including marks and spaces between marks, wherein the lengths of spaces vary non-redundantly from the lengths of marks, wherein each mark and each space has a length that is one of a set of quantized lengths that vary between a minimum length and a maximum length, and wherein a minimum non-zero length difference between any two lengths in the set of quantized lengths is less than said minimum length;

a demodulator that expresses said signal as a first plurality of non-overlapping blocks of bits, said first plurality of non-overlapping blocks of bits including selected blocks of bits which are to be transformed into a second plurality of blocks of bits, each of said selected blocks of bits having an equal, plural number of bits;

a circuit that transforms each of said selected blocks of bits in said first plurality of non-overlapping blocks of bits into a corresponding block of bits in said second plurality of block of bits, without reference to any prior or subsequent block of bits from among said selected blocks of bits, each block of bits in said second plurality of blocks of bits having an equal, plural number of bits, said plural number of bits in each block of bits in said second plurality of blocks of bits being decreased relative to the number of bits in the corresponding selected block of bits in said first plurality of non-overlapping blocks of bits.

\* \* \* \* \*

UNITED STATES PATENT AND TRADEMARK OFFICE
CERTIFICATE OF CORRECTION

PATENT NO. : 6,014,355
DATED : January 11, 2000
INVENTOR(S) : Bailey

It is certified that error appears in the above-identified patent and that said Letters Patent is hereby corrected as shown below:

On the Title Page:

[*] Notice:

Item [56] References Cited
"346921     12/1978     Australia" is deleted.

Item [57] ABSTRACT
The Abstract is deleted in its entirety and substituted with the following:

--An improved system for recording and playing back digital information in a special pulse-length modulation format on a disc-shaped record is disclosed. The digital information is stored in a succession of alternating marks and spaces, both having variable lengths. The system may include recording methods and apparatuses that transform blocks of binary bit sequences into corresponding intermediate signals by, e.g.,
(a) designating unique increments of lengths for each such sequence,
(b) generating a final signal that includes those uniquely-designated increments of length, and
(c) recording the final signal as a set of physical features of quantized lengths.
The lengths vary between a minimum length and a maximum length that is greater than twice the minimum length and have a non-zero minimum difference between the lengths of any such physical features that is less than the minimum length. Storage discs may be made in accordance with the recording method or by the recording appartus. The system may also include playback methods and apparatuses that:
(a) detect such physical features,
(b) generate a signal which is indicative of the lengths of those features and is comprised of a first plurality of non-overlapping blocks of bits, and
(c) transform selected ones of those blocks of bits into corresponding blocks of bits in a second plurality of blocks and bits, each of which contains a smaller number of bits than the corresponding selected block of bits in the first plurality of blocks and bits.--

UNITED STATES PATENT AND TRADEMARK OFFICE
CERTIFICATE OF CORRECTION

PATENT NO. : 6,014,355
DATED : January 11, 2000
INVENTOR(S) : Bailey

It is certified that error appears in the above-identified patent and that said Letters Patent is hereby corrected as shown below:

The paragraph bridging columns 1 and 2 is deleted in its entirety and substitute with the following:

--The present invention is embodied in a system for recording and playing back digital information on a record medium, in which the information is stored in a succession of spaced marks.--

Column 2,
Line 38, "each represents" should read --they represent--.
Line 66, "marks (and spaces)" should read --pulses--.

Column 4,
Line 22, after the sentence ending in "likewise variable," the following is inserted:

--The length of each mark is representative of a separate one of a succession of multi-bit binary code blocks. The spaces between successive marks also have discretely-variable lengths representative of separate blocks in the succession of code blocks.--

Column 5,
Lines 16, 20 and 31 "decoder" should read --decoder (interleaver)--.

UNITED STATES PATENT AND TRADEMARK OFFICE
CERTIFICATE OF CORRECTION

PATENT NO.    : 6,014,355
DATED         : January 11, 2000
INVENTOR(S)   : Bailey Page 3 of 6

It is certified that error appears in the above-identified patent and that said Letters Patent is hereby corrected as shown below:

In the Figures:

Figure 2 is deleted and substituted with the following:

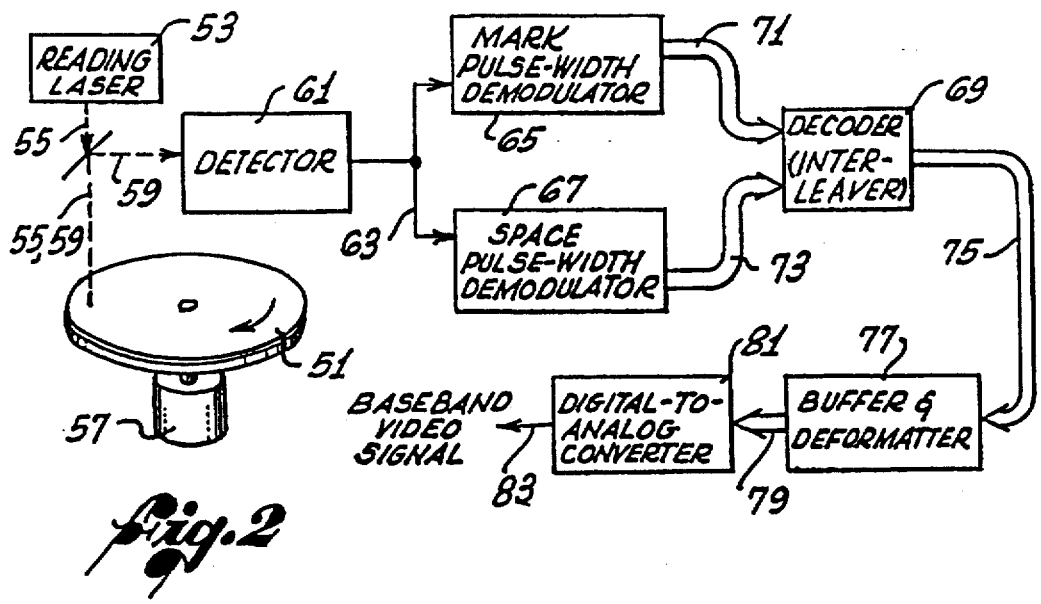

Fig. 2

UNITED STATES PATENT AND TRADEMARK OFFICE
CERTIFICATE OF CORRECTION

PATENT NO. : 6,014,355
DATED : January 11, 2000
INVENTOR(S) : Bailey

It is certified that error appears in the above-identified patent and that said Letters Patent is hereby corrected as shown below:

In the Figures:

Figure 4 is deleted and substituted with the following:

| CODE BLOCK | HEXADECIMAL EQUIVALENT | PULSE LENGTH |
|---|---|---|
| 0000 | 0 | 1.0L |
| 0001 | 1 | 1.1L |
| 0010 | 2 | 1.2L |
| 0011 | 3 | 1.3L |
| 0100 | 4 | 1.4L |
| 0101 | 5 | 1.5L |
| 0110 | 6 | 1.6L |
| 0111 | 7 | 1.7L |
| 1000 | 8 | 1.8L |
| 1001 | 9 | 1.9L |
| 1010 | A | 2.0L |
| 1011 | B | 2.1L |
| 1100 | C | 2.2L |
| 1101 | D | 2.3L |
| 1110 | E | 2.4L |
| 1111 | F | 2.5L |

Fig. 4

UNITED STATES PATENT AND TRADEMARK OFFICE
CERTIFICATE OF CORRECTION

PATENT NO. : 6,014,355
DATED : January 11, 2000
INVENTOR(S) : Bailey

It is certified that error appears in the above-identified patent and that said Letters Patent is hereby corrected as shown below:

<u>Claim 8,</u>
Line 1, "7" should read --1--.

<u>Claim 13,</u>
Line 6, after the word "time" the following is inserted:

--durations correponding to successive samples of said digital signal:
a second pulse width modulator, receiving said digital signal, and modifying said binary output pulses to also have time durations of a second binary level different than
said first binary level to form a continuous stream of pulses of opposite binary levels, so that each two immediately adjacent output signals from said controlling means include one pulse of said first binary level immediately adjacent to another pulse of said second binary level; and
a writing source driven by said continuous stream of pulses to write on the second record medium--.

UNITED STATES PATENT AND TRADEMARK OFFICE
CERTIFICATE OF CORRECTION

PATENT NO. : 6,014,355
DATED : January 11, 2000
INVENTOR(S) : Bailey

It is certified that error appears in the above-identified patent and that said Letters Patent is hereby corrected as shown below:

Claim 21,
Line 1, "in" should read --on--.

Claim 29,
Lines 1 and 25, "in" should read --on--.

Claim 30,
Lines 1 and 25, "in" should read --on--.

Claim 42,
Lines 1 and 27, "in" should read --on--.

Signed and Sealed this

Twenty-sixth Day of June, 2001

Attest:

Attesting Officer

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,014,355
DATED : January 11, 2000
INVENTOR(S) : Bailey

It is certified that error appears in the above-identified patent and that said Letters Patent is hereby corrected as shown below:

On the Title Page:
Between items [73] and [21] please delete the following:
-- [*] Notice: This patent issued on continued prosecution application filed under 37CFR 1.53(d), and is subject to twenty year patent term provisions of 35 U.S.C. 154(a)(2). --.

Item [56] References Cited
"346921    12/1978    Australia" is deleted.

Item [57] ABSTRACT
The Abstract is deleted in its entirety and substituted with the following:

--An improved system for recording and playing back digital information in a special pulse-length modulation format on a disc-shaped record is disclosed. The digital information is stored in a succession of alternating marks and spaces, both having variable lengths. The system may include recording methods and apparatuses that transform blocks of binary bit sequences into corresponding intermediate signals by, e.g.,
(a) designating unique increments of lengths for each such sequence,
(b) generating a final signal that includes those uniquely-designated increments of length, and
(c) recording the final signal as a set of physical features of quantized lengths.
The lengths vary between a minimum length and a maximum length that is greater than twice the minimum length and have a non-zero minimum difference between the lengths of any such physical features that is less than the minimum length. Storage discs may be made in accordance with the recording method or by the recording appartus. The system may also include playback methods and apparatuses that:
(a) detect such physical features,
(b) generate a signal which is indicative of the lengths of those features and is comprised of a first plurality of non-overlapping blocks of bits, and
(c) transform selected ones of those blocks of bits into corresponding blocks of bits in a second plurality of blocks and bits, each of which contains a smaller number of bits than the corresponding selected block of bits in the first plurality of blocks and bits.--

UNITED STATES PATENT AND TRADEMARK OFFICE
CERTIFICATE OF CORRECTION

PATENT NO.   : 6,014,355
DATED        : January 11, 2000
INVENTOR(S)  : Bailey

It is certified that error appears in the above-identified patent and that said Letters Patent is hereby corrected as shown below:

The paragraph bridging columns 1 and 2 is deleted in its entirety and substitute with the following:

--The present invention is embodied in a system for recording and playing back digital information on a record medium, in which the information is stored in a succession of spaced marks.--

Column 2,
Line 38, "each represents" should read --they represent--.
Line 66, "marks (and spaces)" should read --pulses--.

Column 4,
Line 22, after the sentence ending in "likewise variable," the following is inserted:

--The length of each mark is representative of a separate one of a succession of multi-bit binary code blocks. The spaces between successive marks also have discretely-variable lengths representative of separate blocks in the succession of code blocks.--

Column 5,
Lines 16, 20 and 31 "decoder" should read --decoder (interleaver)--.

UNITED STATES PATENT AND TRADEMARK OFFICE
CERTIFICATE OF CORRECTION

PATENT NO. : 6,014,355
DATED : January 11, 2000
INVENTOR(S) : Bailey

It is certified that error appears in the above-identified patent and that said Letters Patent is hereby corrected as shown below:

In the Figures:

Figure 2 is deleted and substituted with the following:

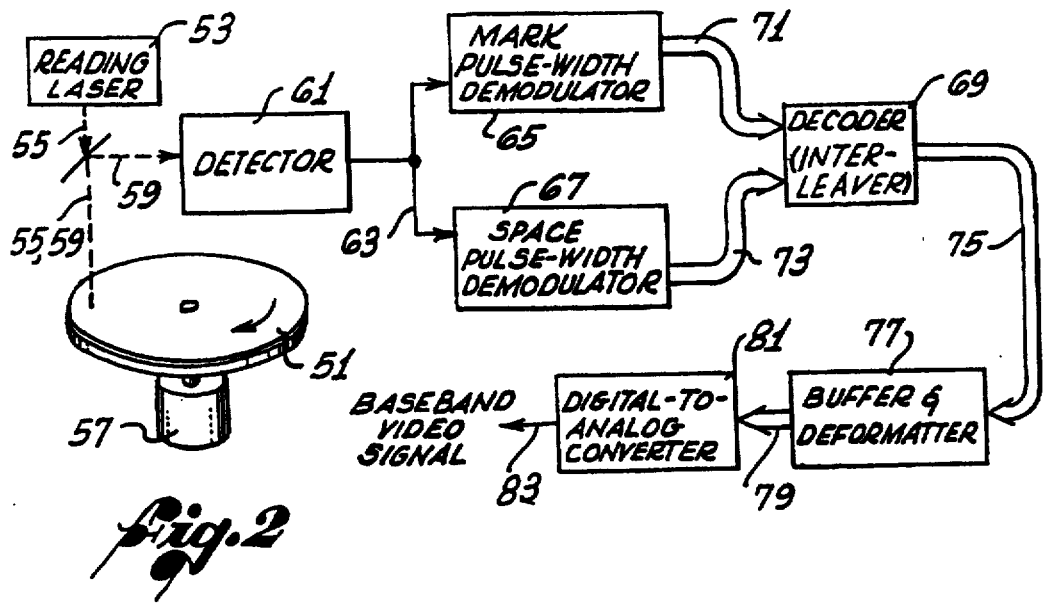

Fig. 2

UNITED STATES PATENT AND TRADEMARK OFFICE
CERTIFICATE OF CORRECTION

PATENT NO. : 6,014,355
DATED : January 11, 2000
INVENTOR(S) : Bailey

It is certified that error appears in the above-identified patent and that said Letters Patent is hereby corrected as shown below:

In the Figures:

Figure 4 is deleted and substituted with the following:

| CODE BLOCK | HEXADECIMAL EQUIVALENT | PULSE LENGTH |
|---|---|---|
| 0000 | 0 | 1.0L |
| 0001 | 1 | 1.1L |
| 0010 | 2 | 1.2L |
| 0011 | 3 | 1.3L |
| 0100 | 4 | 1.4L |
| 0101 | 5 | 1.5L |
| 0110 | 6 | 1.6L |
| 0111 | 7 | 1.7L |
| 1000 | 8 | 1.8L |
| 1001 | 9 | 1.9L |
| 1010 | A | 2.0L |
| 1011 | B | 2.1L |
| 1100 | C | 2.2L |
| 1101 | D | 2.3L |
| 1110 | E | 2.4L |
| 1111 | F | 2.5L |

Fig. 4

UNITED STATES PATENT AND TRADEMARK OFFICE
CERTIFICATE OF CORRECTION

PATENT NO.   : 6,014,355
DATED        : January 11, 2000
INVENTOR(S)  : Bailey

It is certified that error appears in the above-identified patent and that said Letters Patent is hereby corrected as shown below:

Claim 8,
Line 1, "7" should read --1--.

Claim 13,
Line 6, after the word "time" the following is inserted:

--durations correponding to successive samples of said digital signal:
a second pulse width modulator, receiving said digital signal, and modifying said binary output pulses to also have time durations of a second binary level different than
said first binary level to form a continuous stream of pulses of opposite binary levels, so that each two immediately adjacent output signals from said controlling means include one pulse of said first binary level immediately adjacent to another pulse of said second binary level; and
a writing source driven by said continuous stream of pulses to write on the second record medium--.

UNITED STATES PATENT AND TRADEMARK OFFICE
CERTIFICATE OF CORRECTION

PATENT NO. : 6,014,355
DATED : January 11, 2000
INVENTOR(S) : Bailey

It is certified that error appears in the above-identified patent and that said Letters Patent is hereby corrected as shown below:

Claim 21,
Line 1, "in" should read --on--.

Claim 29,
Lines 1 and 25, "in" should read --on--.

Claim 30,
Lines 1 and 25, "in" should read --on--.

Claim 42,
Lines 1 and 27, "in" should read --on--.

This certificate supersedes Certificate of Correction issued June 26, 2001.

Signed and Sealed this

Twenty first Day of August, 2001

*Attest:*

*Attesting Officer*

NICHOLAS P. GODICI
*Acting Director of the United States Patent and Trademark Office*